United States Patent
Rabinowitz (10) Patent No.: US 11,025,526 B2
(45) Date of Patent: Jun. 1, 2021

(54) CONTROL OF EVENT-DRIVEN SOFTWARE APPLICATIONS

(71) Applicant: Paul Oren Rabinowitz, Frisco, TX (US)

(72) Inventor: Paul Oren Rabinowitz, Frisco, TX (US)

( * ) Notice: Subject to any disclaimer, the term of this patent is extended or adjusted under 35 U.S.C. 154(b) by 0 days.

(21) Appl. No.: 16/950,928

(22) Filed: Nov. 18, 2020

(65) Prior Publication Data

US 2021/0083962 A1    Mar. 18, 2021

(51) Int. Cl.
    *G06F 15/177*    (2006.01)
    *H04L 12/751*    (2013.01)
    *H04L 12/24*     (2006.01)

(52) U.S. Cl.
    CPC .......... *H04L 45/02* (2013.01); *H04L 41/0803* (2013.01); *H04L 41/22* (2013.01)

(58) Field of Classification Search
    USPC ......................................................... 709/220
    See application file for complete search history.

(56) References Cited

U.S. PATENT DOCUMENTS

| | | | | |
|---|---|---|---|---|
| 2006/0092857 A1* | 5/2006 | Ansari | ................... | H04L 45/02 370/254 |
| 2008/0267175 A1* | 10/2008 | Mo | ........................ | H04L 45/028 370/357 |
| 2010/0040061 A1* | 2/2010 | McGuire | ................. | H04L 45/00 370/392 |
| 2014/0075048 A1* | 3/2014 | Yuksel | .................... | H04L 45/28 709/242 |
| 2016/0218961 A1* | 7/2016 | Lindem, III | ........ | H04L 12/4633 |
| 2017/0171072 A1* | 6/2017 | Bogdanovic | ............ | H04L 45/74 |
| 2020/0336553 A1* | 10/2020 | Yeddula | ................ | H04L 45/306 |

* cited by examiner

*Primary Examiner* — Anthony Mejia (57) ABSTRACT

A method for modeling and execution of event-driven software applications. Its main parts are the routing graph model, the run time engine and optionally a user interface and automatic configuration modules. The routing graph is comprised of routing and processing task nodes. Routing nodes are enriched with node-type specific event routing logic. Task nodes process specific types of events and produce output events. The run time engine executes the routing graph model, based on the routing nodes logic and the tasks processing functions. The user interface component is used to compose and manage the routing graph configuration. The automatic configuration modules may be used to combine and configure predefined routing subgraphs into a resulting routing graph model.

14 Claims, 10 Drawing Sheets

CONTROL OF EVENT-DRIVEN SOFTWARE APPLICATIONS

BACKGROUND

Software systems have been growing in volume and complexity of their code base. Some code bases consist of many thousands of code files. The difficulty in understanding and maintaining these systems stems from several factors. The sheer size of the code base is a prime contributor to complexity. Another factor is the way the code is organized. Commonly, the code base is organized based on a technological affinity or a resource in use. This source code organization is not conductive to exploration and understanding of the core functionality. The data flow, which in general can be perceived as a sequence of processing steps and intermediate results that are needed to perform a specific task, is hard to discern from the code. It is interleaved with the data processing steps code, and further abstracted by modern software paradigms such as polymorphism and inversion-of-control.

This state of affairs is not a necessity. In contrast to software systems, modern cities, which arguably surpass other man-made system in their complexity, are built around a transportation infrastructure of highways, roads and streets. This built-in infrastructure allows to abstract the problem of orientating and navigating around the city into maps and then create automated turn-by-turn navigation systems. Currently software systems don't have a comparable solution that will help in understanding and navigating their processes and code bases. This results in high learning curves and lowers the productivity of the software teams responsible for developing and maintaining those systems.

The field of this invention is event driven software applications. Event driven applications are characterized by the fact that the execution of the constituent tasks or modules is driven by the data events incoming into the application, as well as the data events that are generated within the application during the processing of incoming events. These applications appear in numerous business scenarios, from financial applications to customer care, commerce, or any other application that would normally process structured records of information.

The scenarios and challenges discussed above are meant to serve as motivating examples, and not meant to limit the scope of the subject matter claimed in this application.

SUMMARY

A method and mechanisms for modeling, design and execution of event-driven software applications is disclosed. This method is centered around the routing graph concept. The routing graph is a directed acyclic graph comprised of routing nodes that route events to their children or back to their parent, and task nodes that process the events, producing additional events.

The graph structure itself appears conceptually similar to a graph of a typical local computer network comprised of routers and end-point compute systems. The novelty is in the coupling of the nodes with specifically crafted event routing logic, that may differ per each type of routing node. The routing logic governs the routing of events in the system.

This data structure and code resides within the computer process or several processes memory, where processes can be run either on a single computing device or several such devices interconnected by networking, and is being executed.

The routing graph effectively decouples events routing, which becomes the data flow, from event processing, done by the task nodes. This allows to present the application as a graph of steps refined by task decomposition. It also allows to visualize and simulate the flow of events in the application, separate from the specific data processing steps taking place. The effect is a significant streamlining of the main aspects of software applications development, from application design to coding, maintenance and operations.

In addition, the routing graph nodes are uniquely capable to serve as a scaffold for additional functionality that may be implemented once and reused by any application built on top of the routing graph system. Having this functionality already implemented, frees the software developers to focus on the specific tasks that need to be accomplished by the software application.

DETAILED DESCRIPTION

A method for modeling, design and execution of data-driven software applications is disclosed.

System Components

Figure 1:
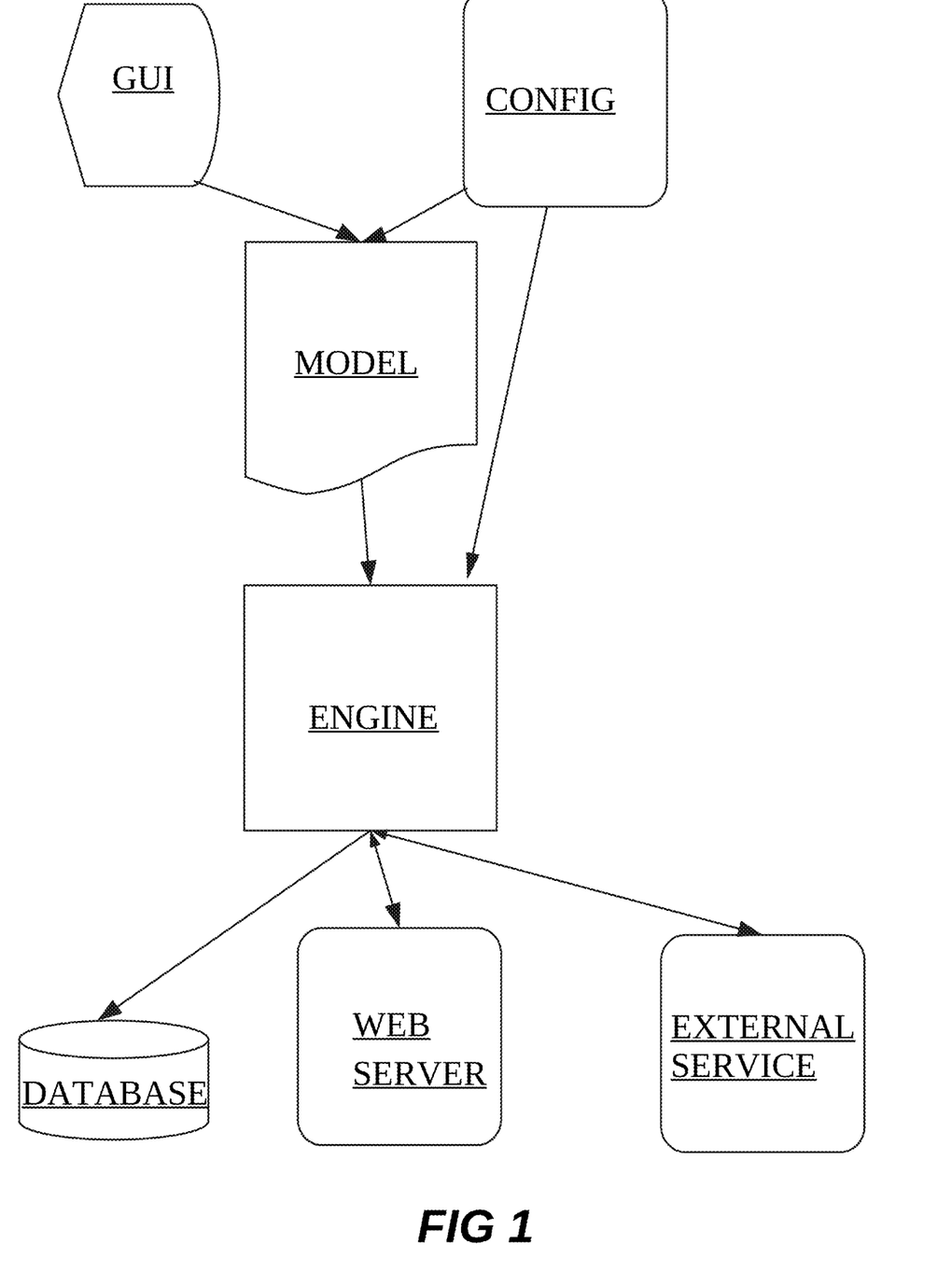
FIG. 1 abstractly illustrates the block diagram of a routing graph application.

FIG. 1 abstractly illustrates the main components of the routing graph system, including the GUI editor, the configuration graph (MODEL) and the run time engine (ENGINE). It includes for illustration purposes additional components that may be integrated with the system, including a specific application code that may edit and configure the routing graph (CONFIG), as well as third party components used by the run time engine tasks to provide services like DATABASE for data persistence, WEB SERVER for accepting requests and sending responses over the web, as well as requesting additional services from web enabled services, and EXTERNAL SERVICES, which may include $3^{rd}$ party components for additional services access.

Data event or simply an event in the context of the current application refers to structured computer data. It can be thought of as a data record, having constituent elements. In addition, in the preferred embodiment, events are split to payload and header sub-records. In some embodiments the header and payload are stored as two sub-records in the same record. Some embodiments may keep header and payload separately, with the header possessing a unique identifier or reference to the payload.

The header contains elements that describe the payload in terms of type, generating task, preceding event (i.e. the input event to the generating task that created the event) and more.

Events can be fed into the system, as well as generated by the task nodes.

A task contains a processing function further constrained to receive an events' payload record as its input and produce output record or a sequence of output records. Upon creation of each output payload by the processing function, the task adds and fills the attributes of the header part thus creating the output event.

A routing node is a specific program function or module capable of receiving events and routing or dispatching them to other nodes, either routing nodes or tasks.

The routing graph is a tree in the computer-science or graph theoretic meaning, in other words it is a directed acyclic graph with a single root node. The routing graph has additional constraints: The intermediate nodes of the routing graph, that may have child nodes, are routing nodes, and the leafs, or the childless nodes are the processing task nodes. In the preferred embodiment each routing nodes' children are ordered. The edges of the routing graph point from a parent node to its child nodes.

Some embodiments may include a User Interface (UI) or a Graphical User Interface (GUI). The UI or GUI may be used to create and edit part or all of the routing graph configuration. Some embodiments may store the routing graph configuration in a readable structured textual format, with configuration sections for each of its nodes. The configuration sections of the child nodes may be contained or referenced in the configuration section of the parent node.

Figure 2:
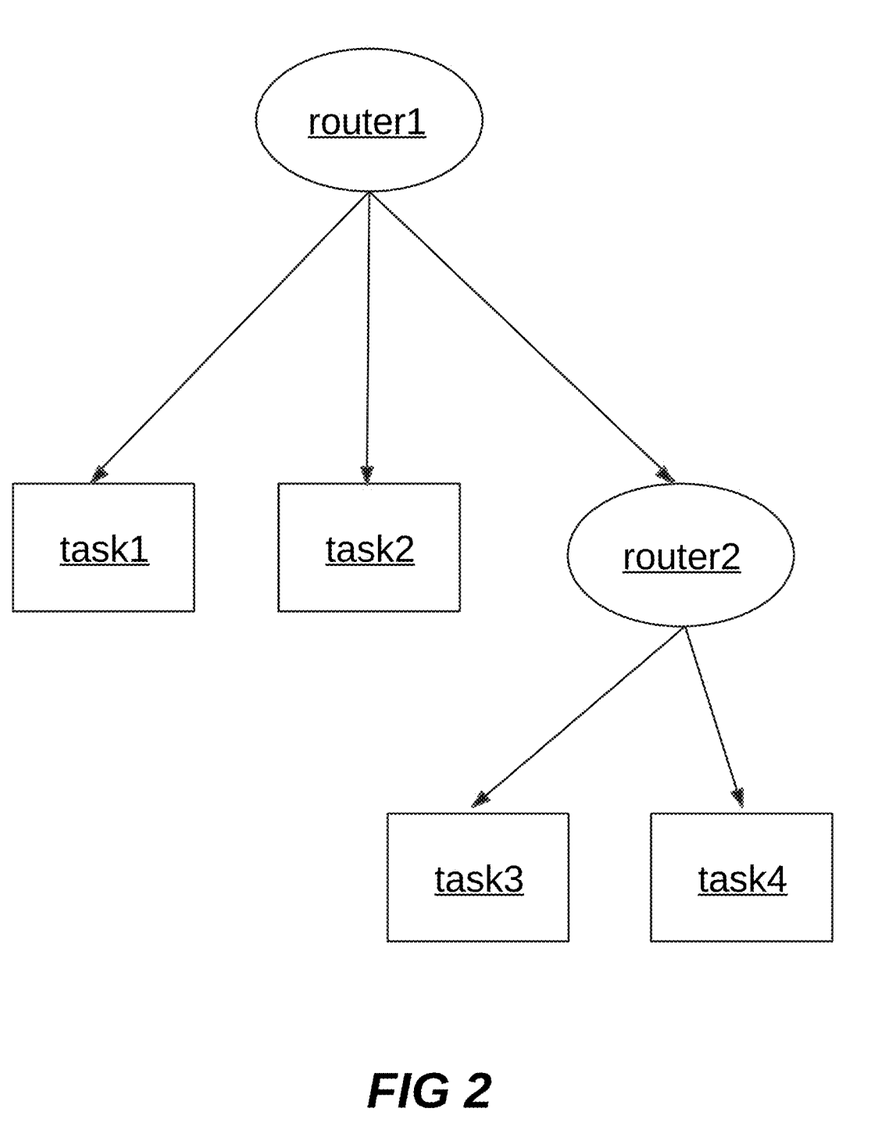
FIG. 2 abstractly illustrates the routing graph configuration. Router1 and router2 are 2 routing nodes and task1 thru task4 are 4 task nodes.

FIG. 2 abstractly illustrates a routing graph configuration. The graph contains 2 routers—router1, having 3 children: task1, task2 and router2, and router2 having 2 children: task3 and task4. The edges 101, 102, 103, 104 and 105 represent parent—child relationships.

Some embodiments may allow template tasks. These tasks will need additional information like name and initial parameters before they are initialized by the run time engine. This information may be provided by a code module or function specified in the configuration template. A single template may give rise to multitude of initialized tasks. Some embodiments may create the runtime routing graph dynamically, using application specific code.

Engine Initialization

In some embodiments the run time engine may have an initialization phase that precedes the main processing phase. When initializing from a routing graph configuration, the configuration graph is traversed by the initialization code, and for each configuration node encountered, a run-time node entity is being created and added to the run-time routing graph. For routing nodes, the initialization will create a run time node that corresponds to the routing node type. In addition, some embodiments may implement a way for parent node to reference each run-time child node. In the preferred embodiment child nodes are grouped in an enumerating children container. For tasks, the initialization will create a run time node with an embedded processing function code.

Figure 3:
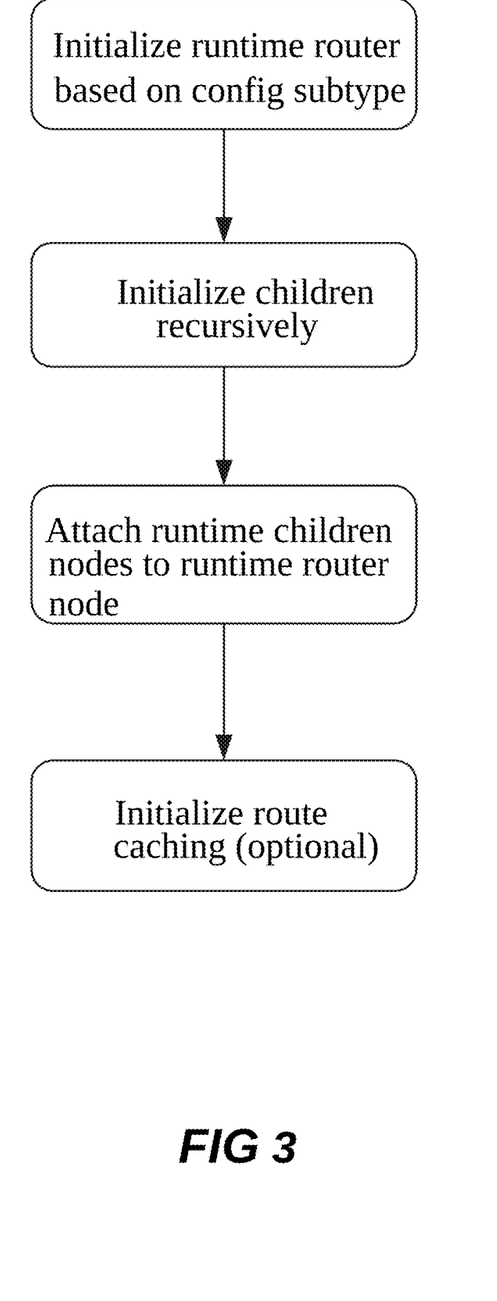
FIG. 3 illustrates the initialization sequence of a routing node

FIG. 3 illustrates the initialization steps for a router node. In some embodiments the routing graph is traversed in a depth-first order. In this order, each node may be visited several times. The first time a node is visited is called pre-order, then all the children nodes are visited recursively, and after the last child is done, the node is being visited for the last time which is called post-order. Some embodiments may initialize the run time object or function associated with the router type during the pre-order visit. Then all children are being initialized. In post-order visit of the parent node, all its children run-time nodes are available, so some embodiments may choose to attach childred to their parent at this stage.

Figure 4:
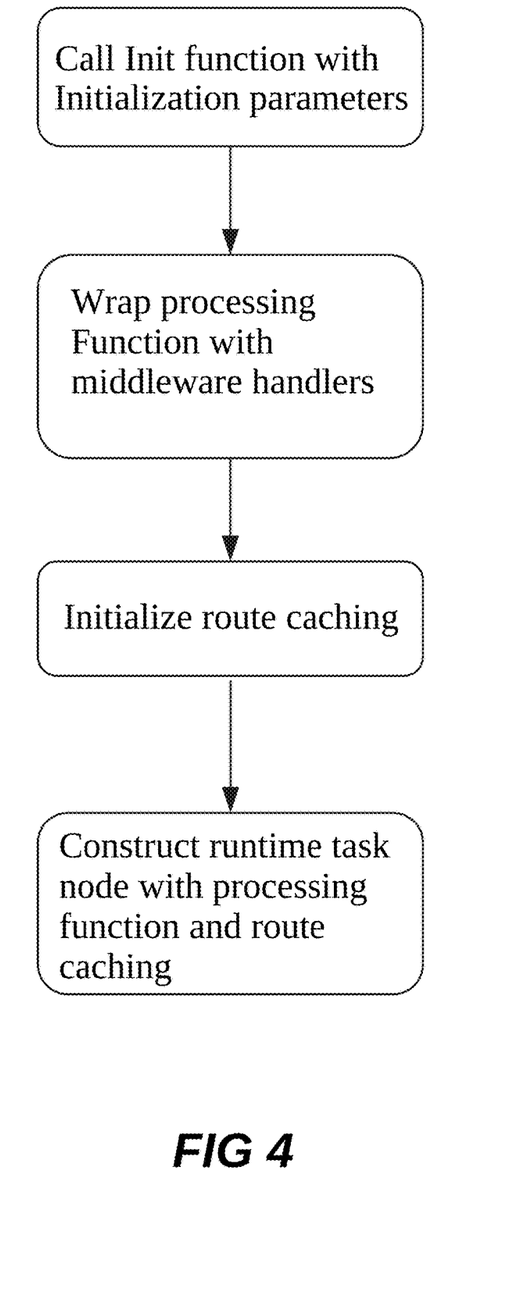
FIG. 4 illustrates the initialization sequence of the task node.

FIG. 4 illustrates the initialization steps for a task node. Step 1, resolves any initialization function and parameters that may have been provided in the task node configuration, and runs an initialization function if provided. The initialization function execution result need to be a single-parameter processing function or method. The initialization function receives the parameters and is being run as part of the task initialization. Examples of this can be the construction of a new processing object out of a class specification, where the initialization code is the class constructor function and the initialization parameters are the constructor parameters. Other embodiments may implement a partial initialization of the event handling function, that is being partially initialized with the initialization parameters values, creating a one-parameter function that will receive and process incoming events payloads. Some embodiments may allow to define either the initialization function or the processing function or both functions inline, meaning the function body is specified within the configuration. In some embodiments the initialization code may provide means to resolve a function name or symbol of a function, where the function is defined elsewhere and link their code into the resulting initialized application.

Step 2 wraps the processing function with generic and specific middleware code. This code adds functionality like catching exceptions, converting the input or output record to a specific format and so on. Some embodiments that implement node specific route caching may implement step 3 that initializes the route cache.

In step 4 the products of the previous steps are being used as parameters in the creation of the run-time task object or function. In addition to these, generic parameters such as a reference to the parent router node and global context that holds all run time global entities may be provided.

After the initialization, the system is ready to process incoming input data, or data events.

Processing Flow

In the preferred embodiment, the processing of events consists of the following 2 phases: in phase 1 the event is being routed to the tasks that will process the event, in phase 2 the event is being processed by each of the tasks that were determined in step 1. Processing tasks will produce output events (one or plural). These output events will also be treated by the same routing-then-processing logic. The processing ends when there are no more events to process. In the preferred embodiment that happens when a designated task processing function returns a null value or a special payload value that signals to the engine not to treat the value any further.

Figure 5:
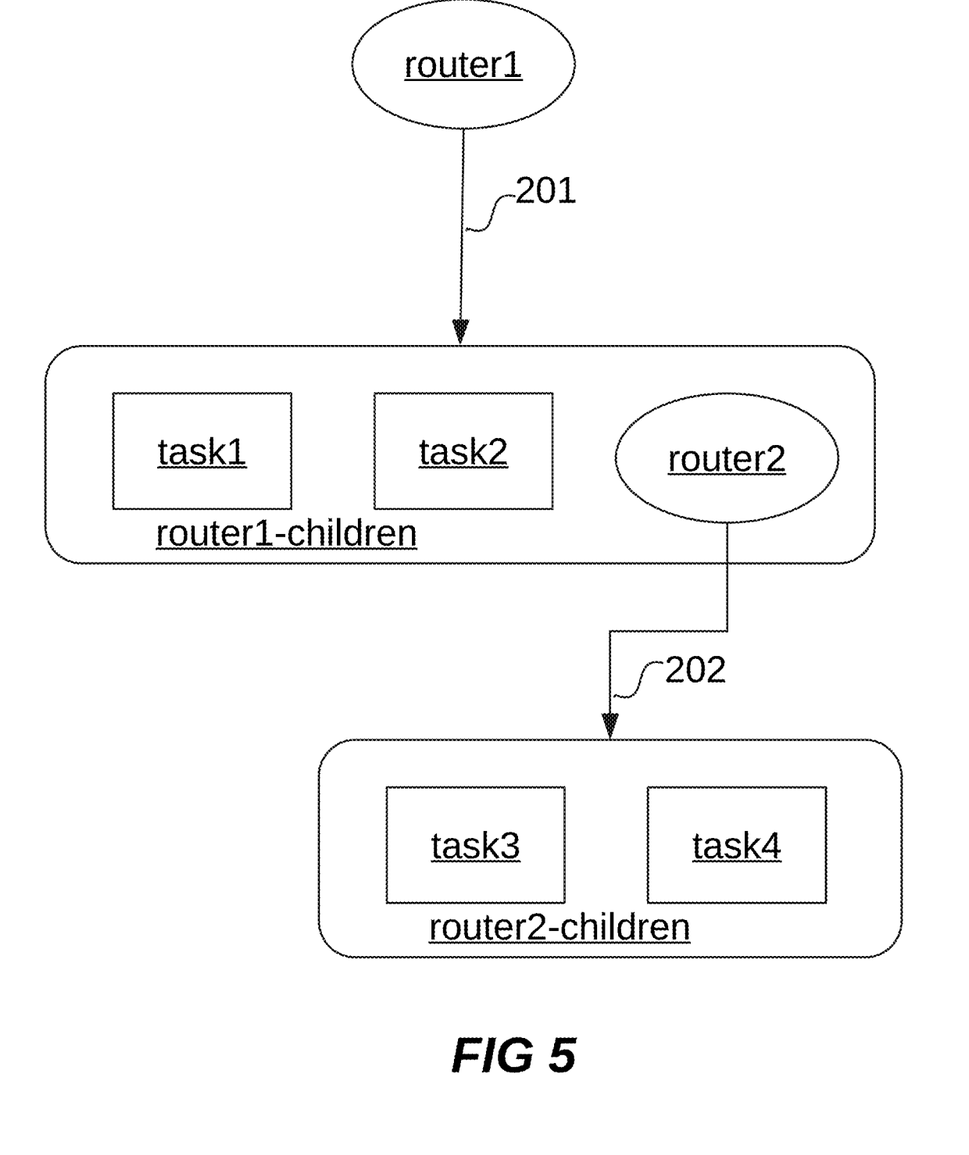
FIG. 5 abstractly illustrates the same routing graph depicted in FIG. 2, with additional implementation details, such as child nodes grouped in a children container.

FIG. 5 abstractly illustrates the memory model of a routing graph. The following in-memory entities are shown:

2 routing nodes, having unspecified types, router1 and router2, and 4 tasks: task1, task2, task 3 and task4. The router1 node has task1, task2 and router2 as its children. The arrow 201 illustrates the reference from router1 to its children container. Router2 has task3 and task4 as children nodes. Arrow 202 illustrates the reference from router2 to its children container.

Event Routing

Routing: The routing step is recursive. There are several predefined routing node types. Each has its own routing logic. In the preferred embodiment, the output of the routing step is a set of one or more tasks that will process the routed event. Each node can only route to its parent (upwards-routing) or to its children (downwards-routing). In the preferred embodiment, routing of an event will start in the first node that encounters or produces the event. First, a downwards-routing is attempted. If the resulting accepting tasks set is empty, an upwards-routing will follow. All node types share the upwards-routing logic. In the preferred embodiment, the routing node types differ in the way they determine the set of eligible children to whom they try to route the event during downwards-routing. They may also possess node-type specific post-routing validation code.

Task nodes can only route upwards to their routing parent, as they don't have children. Since tasks always route back to their parent, some embodiments may choose to incorporate the tasks routing logic as part of the tasks' parent router node. These embodiments will only have either pure routing nodes or routing nodes with attached processing tasks. The preferred embodiment is treating tasks as separate graph nodes with their own routing logic.

Upwards-routing: If the set of potential routing children is empty, or if the downwards-routing for all eligible children yielded an empty set of processing tasks, the node will route the message to its parent router node. The parent node will then route the event according to its own routing logic. The process stops when the set of next tasks is non-empty (we say that the event was accepted), or when none of the predecessor routers accepted the event, all the way up to the root of the graph. In the preferred embodiment this situation is treated as a routing exception. Routing exceptions should be treated as system errors that require troubleshooting and a fix in the form of a change to the routing graph configuration or creation code.

Node-type specific downward-routing: In each recursive step, each one of the eligible children is trying to route the event. The recursion ends with one or more task nodes. If the child node is a task, it checks if the event payload type conforms to the input type of the tasks' function, meaning the processing function is capable to process the events' payload. If it does, the task is added to the set of events' accepting tasks. By way of return from the recursive steps, all preceding routers are aware of the descendant tasks that accepted the event, and are considered as accepting routers themselves.

Figure 6:
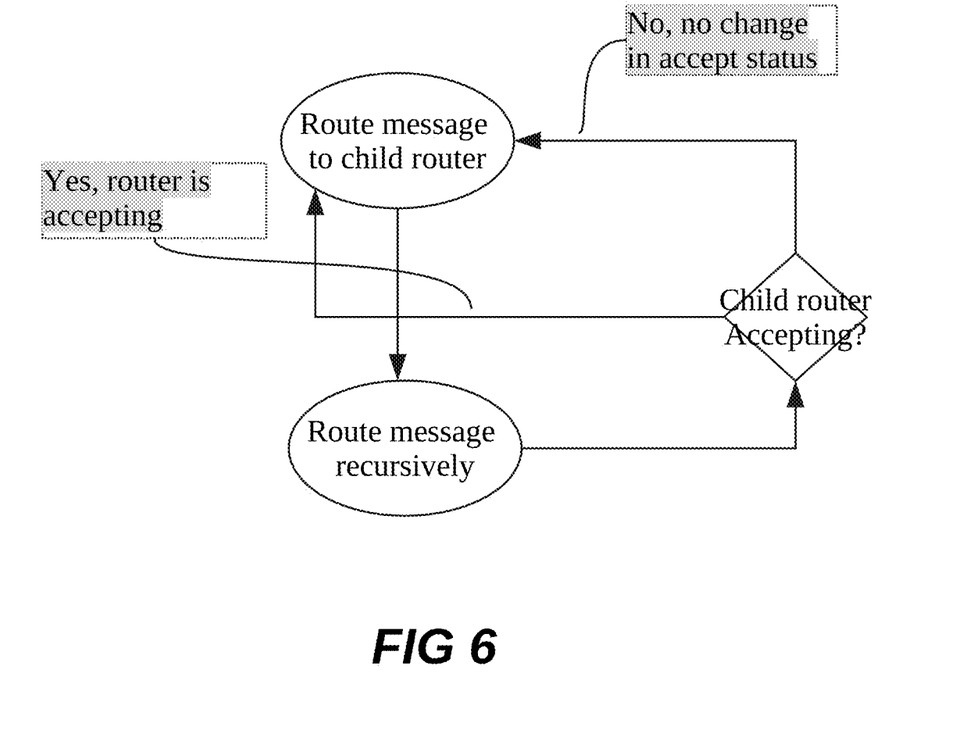
FIG. 6 illustrates downward-routing step from parent router to child router nodes

FIG. 6 abstractly illustrates a parent router to child router downward-route step. The child router does its own downward-routing. If it finds accepting tasks, then it is considered accepting, and the parent router also receives the accepting tasks set as a result of the downward-routing, adds it to other accepting tasks that may be available from other children, and the route status is set to accepting. If the child router downward-routing comes up with an empty accepting tasks set, the resulting status of the parent routing node is unchanged. The initial status of the each node before the downward-routing is not-accepting. If the downward-routing for all eligible children is performed and no accepting tasks were found, then the final downward-routing status is not-accepting. If the node is not the root node, it will attempt an upward-routing step, not shown in the drawing. If the downward-routing stage result with accepting status, the routing node may run validation on the accepting tasks set. For example, the choose-one router may check if all accepting tasks, assuming more than one, are descendants of a single child node.

Figure 7:
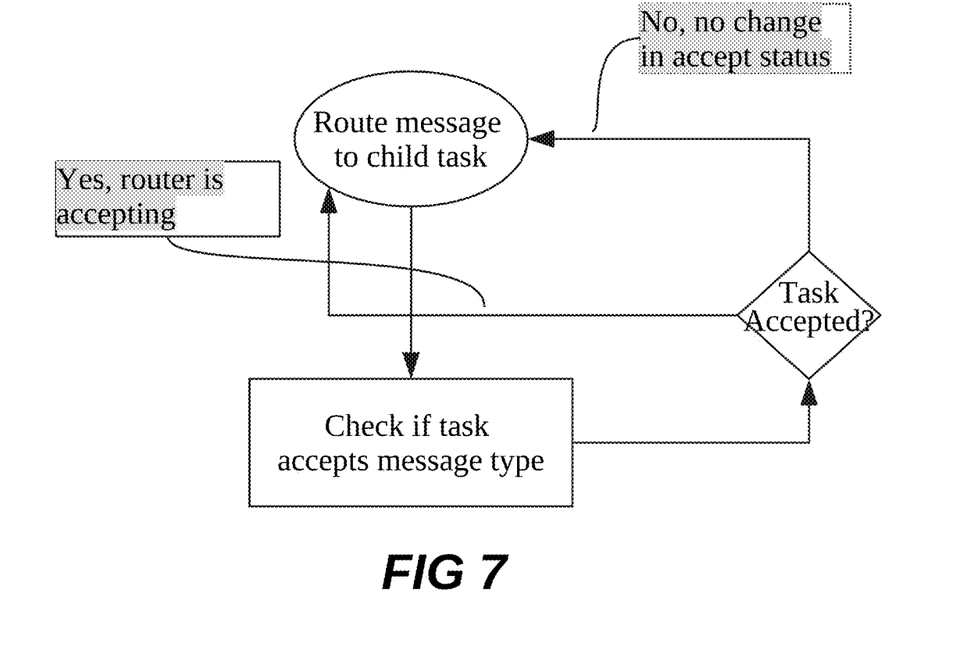
FIG. 7 illustrates downward-routing step from parent router to child task nodes FIG. 8 abstractly illustrates a flow of massages in a routing graph, using full routing FIG. 9 abstractly illustrates a flow of massages in a routing graph, using cached routing FIG. 10 abstractly illustrates a flow of massages in a routing distributed graph, using cached routing FIG. 11 abstractly illustrates a GUI, split into 2 components, one showing the router nodes and the second showing the task nodes.

FIG. 7 abstractly illustrates a parent router to a child task downward-route step. This is the last step in the recursive downward-route search. The task will check if the message type passed from the parent conforms to the processing function input parameter type. Some embodiments may use the underlying programming language type checks to check for conformance. Some embodiments may use tags to enhance the task specificity of accepted messages available to the developer of the graph. The tags may be defined as overriding the original message type, or adding to it.

Some embodiments can use a boolean processing function or a multi-choice function either in a separate task or as a middleware handler as described below, to query the payload and attach a derived (sometimes called narrowing) type tag to the header. In some embodiments tags may be declared as derived from the original types or other tags. This causes tasks that accept the original type or tag to accept the derived-tag tagged event as well. The opposite does not hold, meaning a task accepting a derived tag will not accept an event with the initial tag or type.

Tags can be used to route the message in the choose-branch or similar routers to the specific task that accepts only that tag, and not the original payload type. Tags can also be useful in limiting acceptance to specific children in parallel routers as well. Some embodiments using tags may allow only a single tag, while other embodiments using tags may allow a set of tags to be attached to the message. Some embodiments using tags may allow a single tag to be used by the task conformance check, while other embodiments may allow a set of tags to be used by the task conformance check. Some embodiments may implement a tags scheme similar to http headers scheme, where tags are also allowed to have values, one or many. The downside of the schemes using multiple tags is that they hinder human explainability of the graph workings, and may complicate the route caching functionality, defined herein later. If the conformance check returns a positive answer, the task is being added to the set of accepting tasks.

Some embodiments may implement some or all of the following router node-type specific downward-routing logic:

Sequential Router

Sequential router will route the event it received from its parent to the first child. It will try to route an event it receives from child in position N to the child in position N+1, unless N is the last child. If N is last, there are no eligible children left, and so it is required by the upwards-routing rule to forward the event of child N to its parent router. If N is not the last child and child N+1 doesn't accept the event forwarded by child N, the preferred embodiment will make sure that an early-termination routing exception message is created and forwarded to the parent router.

Parallel Routers

The parallel router nodes route events downwards-routed from the parent to all the children. Some embodiments will ensure that the results are independent of the order of execution of the accepting tasks. Some embodiments may execute the resulting processing tasks in parallel, potentially using several threads of execution. The following variants may be implemented by some embodiments:

A parallel one-shot router will forward the event it received from its parent to all its children. Any event sent upwards by any of the children is upwards-routed to the parent of the parallel router. In some embodiments, parallel routers may have execution strategies that specify if the accepting tasks should be executed in parallel. In some embodiments, should there be several accepting tasks under the parallel one-shot node, their output events may be reordered in a canonical order that is implied by the order of the task nodes in the routing graph, or another user defined order.

A parallel re-entrant router will downward-route the event of its parent, as well as events from any child nodes to all its children. In order to avoid infinite loops of processing, it may keep a counter of 'generation'. This counter is taken from the predecessor event and incremented. each time an event reaches the parallel re-entrant router. It is kept on the header portion of the event. If a predetermined limit number of 'generations' was exceeded, the parallel re-entrant router will stop routing downwards. In some embodiments it may generate a routing loop-limit-exceeded exception. Note that a one-shot parallel router can be viewed as a special case of the reentrant parallel router when the counter above is set to zero.

A parallel choose-branch router will try to route an event coming from its parent to all its children, same as parallel one-shot router. If more than one child will yield descending tasks that accepts the event, it will output an ambiguous-choice exception event to its parent router, and no further processing will be done on the event.

A dual router. This router allows to mimic both the sequential and parallel one-shot routers. The children are split into two groups. Group A child nodes receive any events that are downwards-routed from the dual router parent. Group B receives the outputs of Group A descendant tasks. The outputs of group B descendant tasks are upwards-routed. It may be modified to allow mimicking other parallel routers as well.

Figure 12:
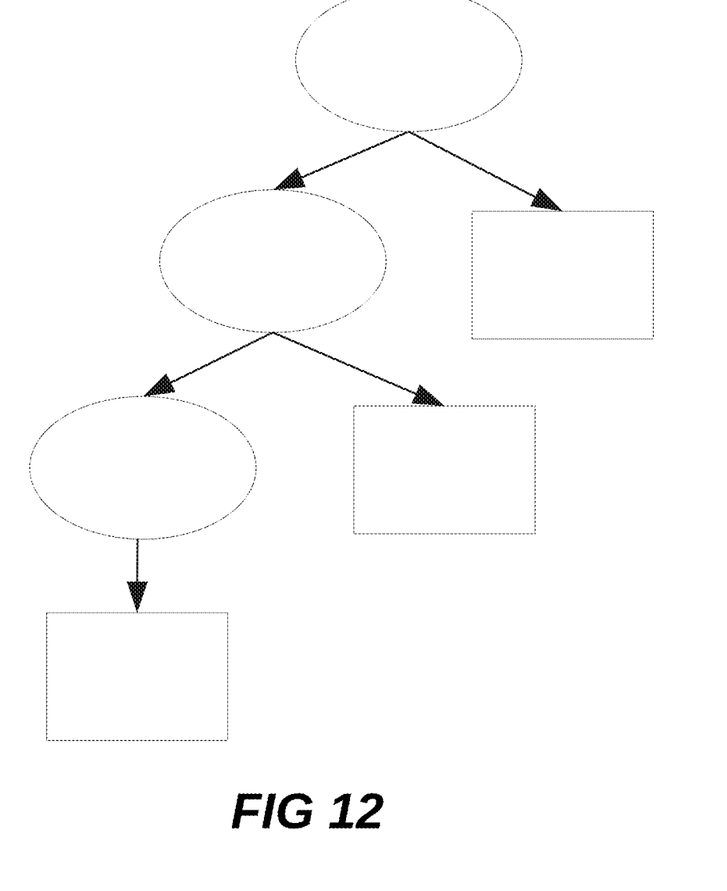
FIG. 12 abstractly illustrates a configuration of dual routers and tasks that mimics the sequential router.

FIG. 12, illustrates by example how a sequential router can be mimicked by a string of such routers having one router child as group A child and one task child as group B, except the last one, having only a task child of group A. An event coming in from a parent node will be forwarded by the router nodes in the sequence, until the last router that has a group A task child. Assuming this child accepts the message, it will process it. Its output message will be forwarded to the router that is the before last router that will forward it to its group B task child, and so on. In this manner, the tasks are performed sequentially, from the lowest task to the top-most one. A parallel router can be mimicked by a subtree of homogenous routers, each has only group A children.

Figure 13:
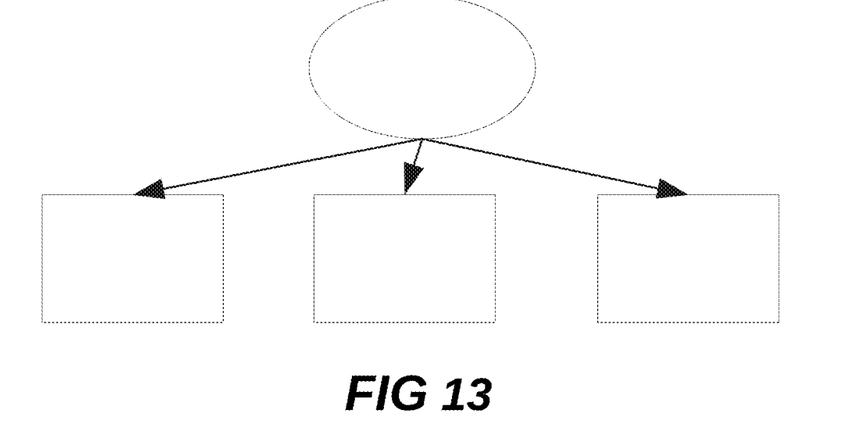
FIG. 13 abstractly illustrates a configuration of a dual router and child tasks that implements the parallel one-shot router.

FIG. 13 is an example of a dual router having only group A task children, acting as a parallel one-shot router.

The routing logic of the dual router demonstrates that the routing logic principle can be viewed as more fundamental in nature than a graph of only sequential and parallel nodes graph, as it is capable of implementing sequential and parallel nodes using a single node type.

The examples of routing node types above are not meant to be exhaustive of all possible node type specific routing logics. Some embodiments may define other routing logic that will introduce new routing functionality, or enhance the described above functionality.

As can be seen, the routing logics are able to implement basic data flow building blocks: the sequential router advances the process one step after the other, the parallel routers provides parallel processing and the choose-one router provides conditional branching.

Additional Properties

Additional desirable traits of the routing system as described so far:

There is no need to 'register' event types with the routing graph, as in many other service oriented systems. Some embodiments can compute if the graph accepts any given event type by simulating the routing step. Some embodiments can annotate each node with the set of types it accepts.

Any number of sub-graphs can be combined into a resulting graph, by making their root nodes into children of a parent node or several parent nodes of another router graph. The parent router nodes can be of any routing type. Some embodiments may leverage this capability to compose the routing graph out of pre-existing smaller graphs dynamically, during the application execution. The difference with other systems in the art that compose a graph dynamically is that the sub-graphs are not chained or attached along data dependency between last task of one sub-graph and first task of a second sub-graph. Due to a new and different process paradigm, the chaining of router graphs is done along root of one sub-graph and a child node position of another sub-graph.

Figure 8:
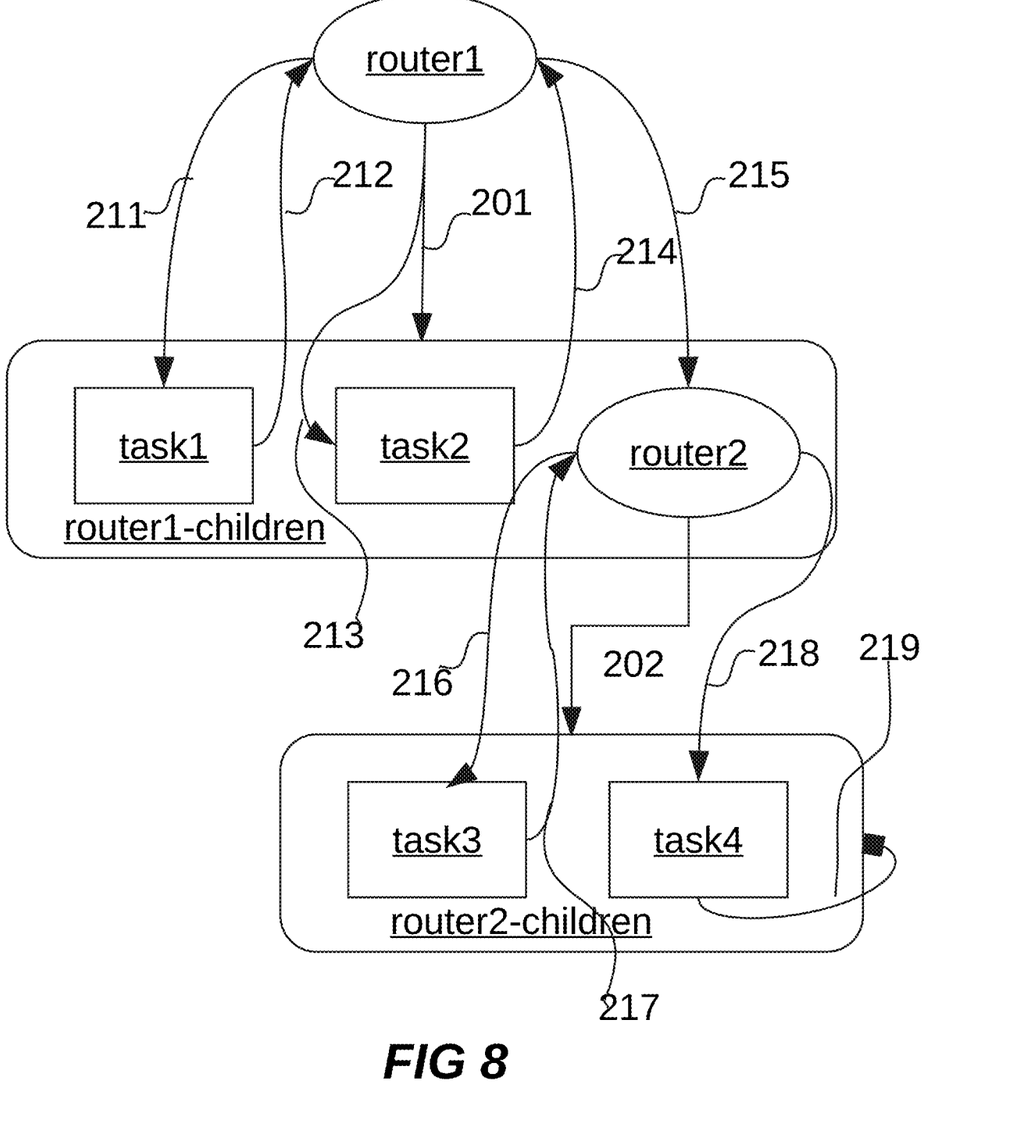

FIG. 8 illustrates by way of example messages flow in a routing graph. The routing graph is the same as in FIG. 5, with some additional assumptions: router1 and router1 are sequential routers. Each task accepts the output message type of the messages produced by the previous task. Thus, task2 accepts task1 output, presumably of type task2-input-type, task3 accepts the output of task2, presumably of type task3-input-type and task4 accepts message of type task4-input-type. Task4 returns a null value. Task1 presumably accepts message of type task1-input-type, routed from router1 [211]. It processes it and produces message2 of type task2-input-type. It routes message2 back to its parent router1 [212]. As router1 is sequential, it routes message2 to the next task, task2 [213]. Task2 processes message2 event and produces message3, which it routes to its parent, router1 [214]. Router1 routes message3 to its next child, router2 [215]. Router2 routes message3 to its first child, task3 [216]. Task3 processes message3 and produces message4. It routes message4 back to router2 [217], which routes it to the next child, task4 [218]. Task4 processes message4 and its processing function produces a null value, which halts the processing [219].

Route Caching

Since the routing of an event is dependent only on the event type and the node from which we start the routing, and these are constant for all events of the same type routed from the same node, the routing result sets can be cached and reused. This means that we may need to route each event type only once, from the node that introduced the event into the system (either the producing task or a router to which the event was injected using a programmatic interface). Future routing of same event type from the same node will reuse the previously computed result-tasks set, thus bypassing some or all of the routing steps.

Some embodiments may implement route caching by using a central caching table. Other embodiments may implement route caching by maintaining caching tables per each node. Some embodiments may implement local node level caching only for task nodes.

Some routing nodes cannot be skipped with route-caching. Examples will include any router that performs additional functionality on the events, or routers with dynamically changed sequence of child nodes. In this case the router node will be part of the cached result set. Events will be forwarded to this router node, possibly using route caching, and it will route the event further, possibly also utilizing route-caching.

Instead of run-time caching, some embodiments may implement static analysis that takes into account the type of the output event, and simulates its routing to calculate the accepting tasks set ahead of run-time or during run-time initialization.

Figure 9:
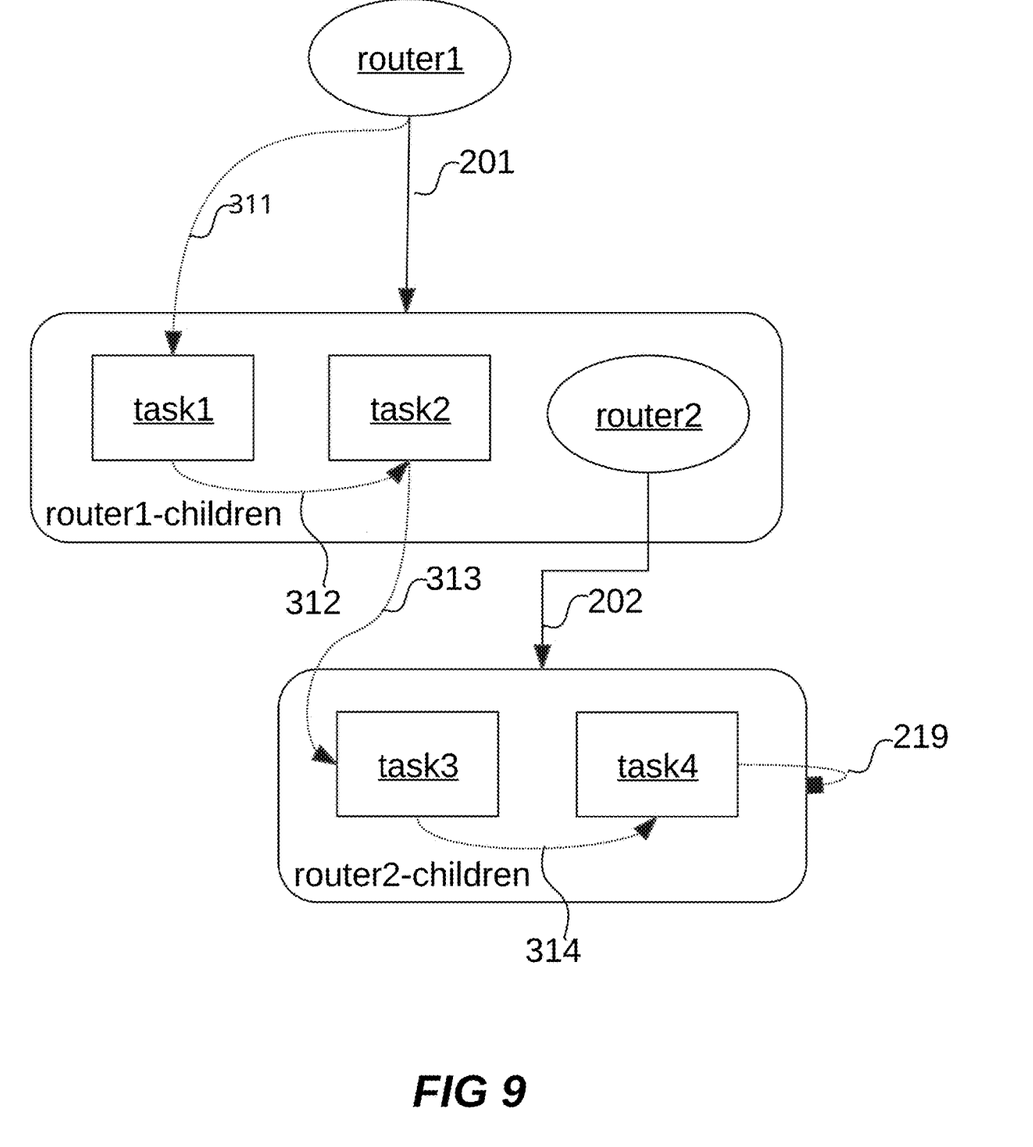

FIG. 9 illustrates an example of events flow with route caching. The graph is similar to the one in FIG. 8. It is assumed that the routing with no caching, such as in FIG. 8 has occurred, and each node remembers, or has cached the target tasks of each event that was routed from it. For example, task1 remembers that task2 is the target task for message2, of task2-input-type type. Thus, it forwards message2 directly to task2, bypassing router1 [312]. In a similar manner, task2 cached task3 as the target for message3, of type task3-input-type. It forwards its output, message3 directly to task3, bypassing both router1 and router1 [313].

Since router nodes are skipped with route-caching, adding child router nodes of the same type as the parent router node will not in general degrade performance. It allows a top-down design of the routing graph, based on decomposition of complex computations into meaningful sub-steps, resulting in a more comprehensible routing graph. A readable routing graph can serve as a map of the application.

Task Nodes

A task node accepts an event from a routing parent, feeds them to its processing function and produces an output event or plural events. The produced event can also be empty (null), a scalar value indicating success or failure, an exception event or a sequence of the previous options. The task further enhances the produced payload record with the event header. Since tasks don't have children nodes, the output events are always routed back to the tasks' parent router.

Additional Generic Capabilities

Additional generic capabilities can be added to the routers and the tasks. The benefit derives from the fact that these capabilities are developed once and will be available to any process that is created based on the routing graph system. These capabilities aim to free the developers from re-implementing generic functionality, allowing them to focus on the application functionality. In this sense, the routing graph serves as a scaffold that implements many non-functional concerns on behalf of routing-graph based applications. Some embodiments implement some of these capabilities as middleware handlers. A middleware handler accepts a tasks processing function as input and produces a modified or enhanced processing function as output. It essentially wraps the processing function with some additional code that is being run either before or after the processing function itself is run. Middleware handlers can be chained to provide a sequence of such enhancements. Some embodiments may define some of the middleware handlers as generic, thus applied for each task. Some embodiments may provide lists of generic as well as specific per-task middleware handlers within the routing graph configuration. Each of these handlers will be applied to the processing function during initialization of the task node. This mechanism is beneficial even if the functionality of these handlers can be implemented by additional tasks, as these additional tasks can clutter the routing graph and obscure the core functionality. Some embodiments may implement some of these capabilities as part of the fixed run time engine code.

The following is a list of additional capabilities. It is not meant to rule out other capabilities that may be added to the routing graph in a similar manner:

Capturing exceptions that are generated by the task processing function and converting them into exception events. In many programming languages, a generated exception need to be captured. If not, it causes a process-level unrecoverable failure which in many cases is not desirable. In some embodiments the exception is being caught by a processing-function wrapping code. This code may populate an exception event payload. Exception-generated events are then handled by designated tasks on the routing graph that accept exception types. In some embodiments these exception handling tasks may implement exception and error logging, retry of failed operations e.g. for dealing with network intermittent outages, error-compensating tasks, circuit breaker tasks that may stop the process after a specific threshold of exception events was reached. Some embodiments may provide some or all of these exception handling functions.

Capturing and logging log requests. These requests may be part of the processing function code and generate log-events. The purpose of these events is to be processed and logged offline, without affecting the main flow of the process. In the preferred embodiment log events are not be treated as regular events that require routing, for the purpose of keeping the main routing graph simple.

Enhancing the produced events with additional header attributes, like preceding event reference, producing task reference, creation timestamp, place-in-sequence if relevant, session-id if relevant and so on.

Re-format or serialize or deserialize the input or the output events from format-A to format-B, by way of example, from the JSON format to a Java class.

Automatic storage of the events in memory or in a database. This frees the developer from dealing with adding the events explicitly to a data store or a database. This allows to index and query these events further down the processing timeline.

Any node, either routing or a task, can be enhanced with authentication authorization and audit (AAA) functionality. This functionality can benefit from the hierarchical structure of the routing graph. AAA functionality that is defined at a particular router node, can be inherited by all nodes in the subtree rooted by this node. Some nodes may allow overriding or adding to the AAA definitions inherited from an ancestor node.

Generic tasks: Some embodiments may implement additional generic tasks, that may be provided out-of-the-box by the routing system. The following are examples of such tasks:

Exception handling tasks, for example a retry task that causes the exception-producing task to retry, until a maximum retry counter is reached. This functionality may be used when the error indicates a transient network failure. Other examples may include the following: set a session status to Error on exception, output a log entry for an exception, execute compensation logic that would roll back some state changes, a circuit breaker that maintains counters of the number of exception events and normal events and shuts down the process if a threshold ratio of exception events vs regular events is exceeded.

Query tasks. Query tasks allow to search previous events and combine them into new events, based on header or payload values. It can leverage either a programmatic query interface, or a declarative query language like SQL, Datalog and so on. The benefit of such query tasks versus allowing the regular task processing functions to query the existing events is that data dependencies can be easily determined. This may help with other considerations. One example is when we want to split a routing graph into subtrees for scalability purposes. It is beneficial for performance purposes to keep tasks that are data-dependent in the same subtree, as if they are in separate subtrees to be defined herein later, we may need to send via computer network a multitude of events from one subtree to another.

Sessions management. Some embodiments may allow to group events into sessions. Sessions are useful to model stateful execution flows, for data security purposes, when we limit access to previous events of the same session as the input event, and more. This can be done at the entrance points to the routing system. Thus after accepting an external request event for processing, the request event can be matched using a pattern or aggregate of some of its attributes' values with a stored values-pattern attached to an existing session. If no such session exists, a new session may be created. Each new session will include at least the attributes-values aggregate and the session unique identifier. Any events that are produced during processing of the session-matched event will inherit the session identifying information. Some embodiments may also maintain the session's state—like Active, Stopped or Error. This will allow to reject without further processing incoming events that belong to a session that is in non-Active state. The Error state can be turned on by an exception event handling task.

Unwinding sequences of records. Some event payloads may consist of a sequence of records. A sequence is a type in its own right, so we can route such events to tasks that accept sequences, and for each record in the sequence they produce a distinct event. Some embodiments may add the position of the record in the original sequence to the header information. If a sequence may hold records of different types that require further processing, the user may choose to use a choose-branch or a parallel router after the sequence unwinding task.

Subtrees as a Service

Some embodiments may implement scalability and availability functionality based on the structure of the routing graph. Any subtree of the routing graph can be viewed as a separate service. The routing graph application can then be scaled by deploying individual subtrees in separate processes, either on the same computer or on separate computers connected by networking.

These processes can additionally be clustered, meaning the same subtree can be deployed in several processes that are combined into a cluster of processes and treated functionally as a single subtree service. This mechanism allows to allocate the most cost-effective resources when scaling out the various remoted subtrees. For example, some embodiments may use compute nodes with less CPU cores and less RAM allocation to scale out a subtree consisting of network or disk related tasks. This can make economical sense, since adding more CPU cores and RAM may not provide improved networking performance while costing more. On the other hand, subtrees with tasks performing complex calculations may require more CPU cores and RAM, and perhaps less network capacity. This routing-tree capability is on the framework level, and may be available to any application that is built on top of it.

Some embodiments may implement this subtree as-a-service capability by integrating with a services orchestration framework, also known in the art as container orchestration frameworks, for example the Kubernetes framework. The integration may be in the form of a run-time initialization phase code or pre-runtime code that edits the service orchestration framework configuration based on the routing graph configuration.

In some embodiments each compute process will contain the complete routing tree configuration, enhanced with remoting configuration (possibly IP addresses and ports of the various subtrees). Some embodiments may choose to initialize only the nodes of subtrees that should be run by the compute process. The complete configuration routing graph may serve as a map specifying where to forward the events. Some embodiments may choose to split the routing graph configuration, so each process has only the subtrees that are run by this process, and the networking information to be able to send and receive events from remoted parent and children subtrees.

In the preferred embodiment, each remotable subtree root generates two kinds of proxy instances, one in each process that implements the subtree, acting as a root, and an additional proxy instance in each process that includes the subtree root as a child. The child instance of proxy is the destination for all the events that need to be routed to any node within the subtree. It forwards all events to the root instance located in a separate process. The root proxy is responsible to send any events that are to be routed outside the current processes subtree to the child proxy instances in the parent subtrees.

When routing with cache-routing, the proxy routing nodes can't be skipped.

Leveraging the subtree-as-a-service capability, the routing graph tree can be initially implemented as a single process for development or troubleshooting convenience, and then split into subtrees that will be separately replicated and deployed across multiple computing processes. This provides a seamless path to application splitting for scalability and availability purposes. Automating the generation of the service or container management configuration stramlines the operational tasks related to large scale distributed applications.

Figure 10:
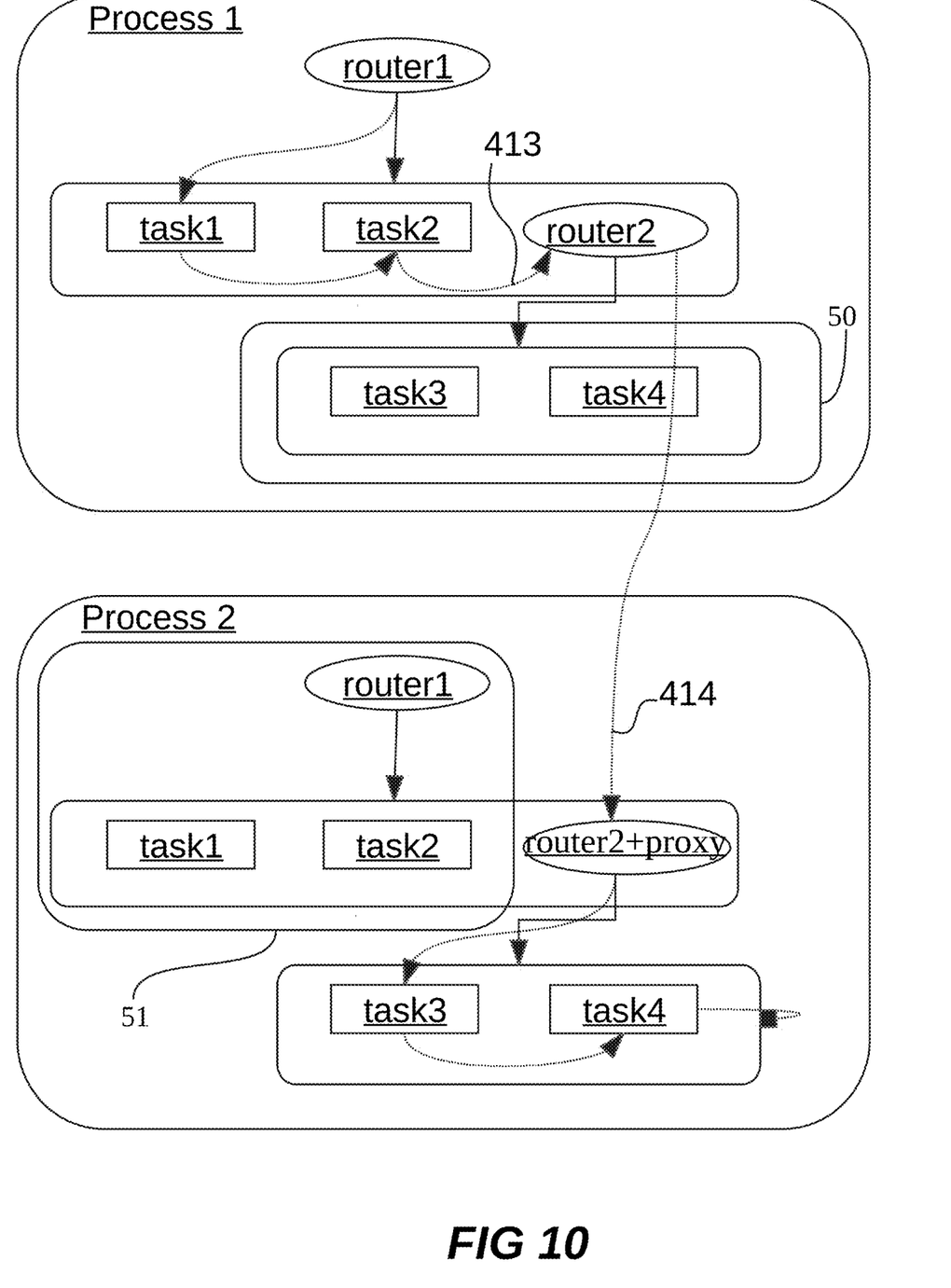

FIG. 10 illustrates by way of example a routing graph where one of the subtrees, rooted by router2 was deployed on a separate process, or remoted. The graph is similar in functionality to the one in FIG. 9. It shows the events flow within each process, and between the processes, involving the two proxy instances, the child instance in process1 and the root proxy in process2 [414]. It uses route caching. However, router2, being a proxy node in process1 cannot be skipped by the route caching [413]. In this illustration, each process posseses the complete routing graph configuration, with some of the nodes not in use. In process 1, unused nodes are shown in box 50 and in process 2, the unused nodes are shown in box 51.

Graphical User Interface

Some embodiments may implement a Graphical User Interface (GUI). The GUI may be integrated in an integrated programming environment (IDE). The GUI allows to visualize and edit the routing graph. Some embodiments may display the task nodes in a separate list view.

Figure 11:
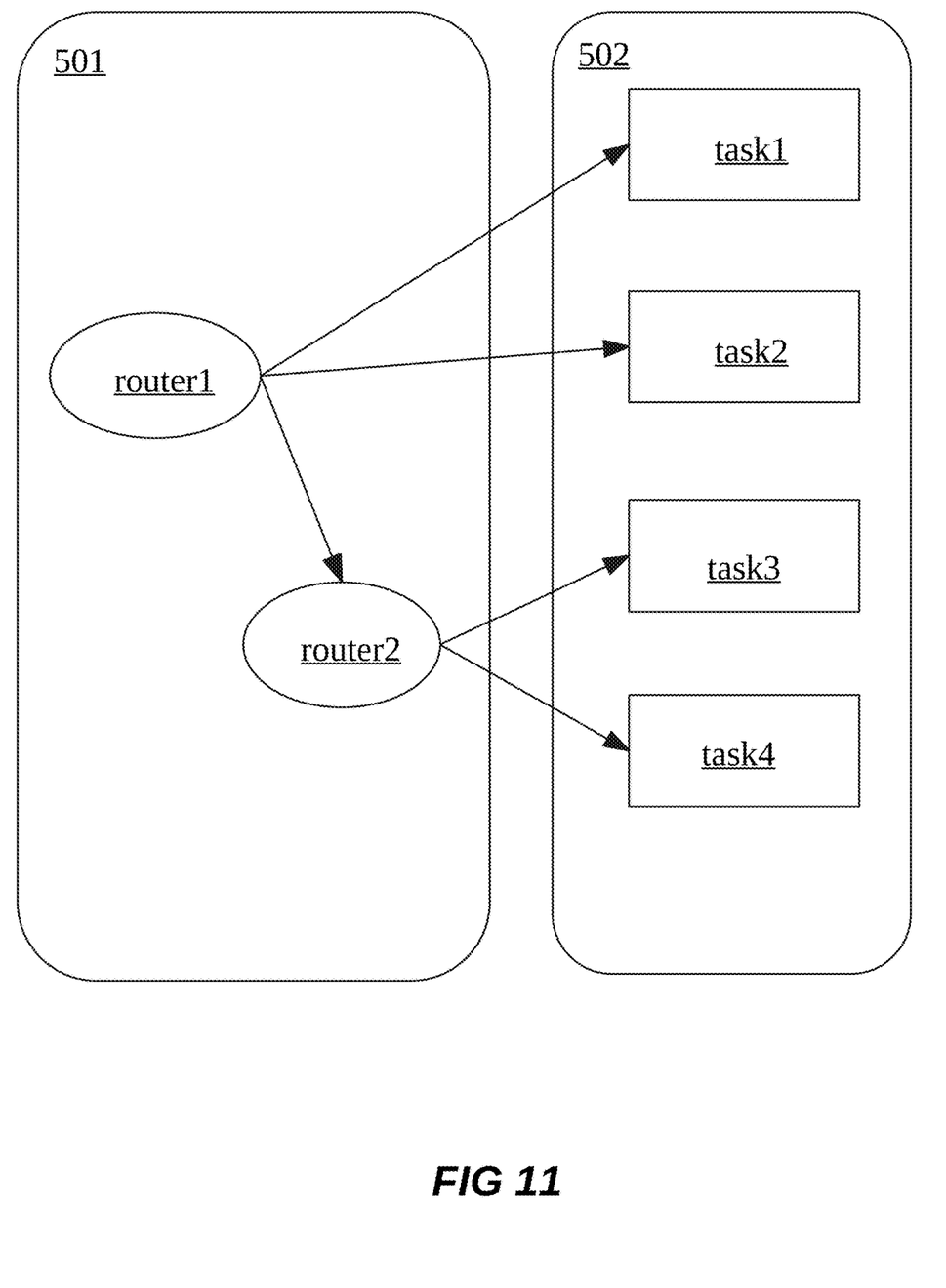

FIG. 11 illustrates the user interface where the tasks are shown in a separate view. The tasks view shows the tasks and their processing functions code in the depth-first tree order, which is aligned with the order of their execution. This view may be coordinated with the routing graph view, to show only the task functions that are in a subtree rooted by the the router node selected in the routing graph view. Conversely, selecting a task in the tasks view may highlight the routers on the path of the task in the routing graph view.

Some embodiments may display upon user action the configuration of a task and allow its editing. Some embodiments may display upon user request the processing function code in a code editor and allow its editing. The code editor may be part of the IDE and also allow debugging of the code.

Some embodiments may implement edit of event attribute values, injection of either edited or stored events into various nodes and may also allow to debug the resulting flow of the run time engine. Some embodiments may allow to simulate the events flow in the system, by using dummy tasks and dummy or empty event payloads. The dummy tasks are configured to accept specific types or tag values, and produce header tags with specific output type or tag value. This functionality may be valuable when designing the routing graph application. The dummy tasks are then replaced with actual ones, capable of processing and producing actual payloads.

Some embodiments may treat some routing nodes as chapters in a document, including additional elements such as a subtree view, a textual summary and optionally predefined tests. The tests consisting of a description and sets of input and generated stored events, and optionally automated test-passing checks. The checks allow to selectively compare the attributes of the test-generated events with the attributes of the stored events. The selectivity deemed needed as some attributes such as timestamps are considered ephemeral and not important to the test result.

Heterogeneous Environments

The routing graph subtrees might be implemented on different computing environments. These environments may differ by the compute hardware used, like different types of processors, including different CPU types, GPU (graphic processing unit) processors, FPGA (Field-Programmable Gate Array), network router processors or specialized processors.

They may also include embodiments that are tailored for different surrounding software environments, like in-browser routing graphs or subtrees, different programming environments or routing graphs implemented inside the operating system kernel. In these cases, the transport between two different subtrees might leverage specialized data transports that are suitable for communication between the various environments.

Some embodiments may specify several subtrees, each specific to a different environment within a single routing graph. The reason for that may be to define and manage the conceptual process, regardless of the separate processing of the environment-specific subtrees. The various subtrees may need to be treated by different code modules to ensure proper deployment, execution and data transport for their designated environment.

The present invention may be embodied in other specific forms while still retaining its spirit and essential characteristics. The described embodiments are to be considered in all respects only as illustrative and not restrictive. Therefore, the scope of the invention is indicated by the following claims rather than by the previous description. Any variations that share the meaning of the following claims or are equivalent to these claims are to be considered as covered withing their scope.

What is claimed is:

1. A computer implemented method for formulating applications based on a routing graph model and an engine, which is computer code that executes this graph, wherein the routing graph being modeled as an acyclic directed graph such that the graph edges direction is always from a parent node to child nodes, where the routing graph further comprising of:

Routing nodes that can forward events either to their child nodes, based on routing node type or to their parent routing node, in case the routing to child nodes yielded no target processing tasks, further the parent or children nodes do their own routing recursively until accepting processing tasks are found or the graph root node is reached, and Task leaf nodes that contain a processing function that can be checked to accept the input event and process an input event payload producing output event or events payload wherein the task further adding an event header for each output event and forward the output event or events to the parent routing node for further routing and processing.

2. The computer-implemented method in accordance to claim 1, wherein the implementation is created, either partially or completely based on routing graph configuration stored on computer media or in computer memory, wherein the routing graph configuration containing a configuration section per each graph node, and where configuration sections of child nodes may be either embedded or referenced within a parent node configuration section.

3. The computer-implemented method in accordance to claim 2, wherein some nodes configuration may be deemed templates, to be augmented with additional configuration data during the creation of the routing graph implementation from an external source.

4. The computer-implemented method in accordance to claim 1, wherein the resulting routing graph implementation is amenable to extensions and modifications during the execution by dynamically adding instantiated sub-graphs root nodes as children of a routing node in another routing graph implementation.

5. The computer-implemented method in accordance to claim 1, wherein one of the routing node types is a sequential router passing events forwarded from its parent to its first child node and passing the output from each child node to the next child node.

6. The computer-implemented method in accordance to claim 1, wherein some of the routing node types are parallel, meaning they forward all incoming events to all of their children, and the parallel routing node further allows additional attributes such as one-shot, re-entrant, choose-branch or dual.

7. The computer-implemented method in accordance to claim 1, wherein the event processing is divided into a routing stage, where the accepting tasks of the event are found, and processing stage where the accepting tasks process the event, wherein the routing stage results being cached either in a central cache, or in local caches per node and the cached results used to skip parts or all of the routing stage in subsequent processing of events of the same type or tag by the same routing node.

8. The computer-implemented method in accordance to claim 1, wherein the task processing functions can be wrapped with additional code that performs some generic functionality.

9. The computer-implemented method in accordance to claim 1, wherein a set of predefined tasks is provided wherein the predefined tasks perform specific generic functionality.

10. The computer-implemented method in accordance to claim 2, wherein each subtree can be viewed as a separate service, allowing the routing graph application to be scaled by deploying individual subtrees in separate processes, either on the same computer or on separate computers connected by computer networks.

11. The computer-implemented method in accordance to claim 2, wherein the routing graph configuration is being managed and operated on by a User Interface (UI), allowing viewing, navigating and editing of both routing and task node configuration.

12. The computer-implemented method in accordance to claim 11 wherein the UI component further integrated with a programming environment or editor, allowing to view edit and optionally debug the task processing functions.

13. The computer-implemented method in accordance to claim 11 wherein The UI component further allows to test the routing flow of an initial event and its resulting events.

14. The computer-implemented method in accordance to claim 11 wherein The UI component further allows to simulate the routing flow of an initial event and its resulting events.

* * * * *